Dec. 10, 1929.    A. W. MEYER    1,739,485
HOOK RULE
Filed Nov. 5, 1926
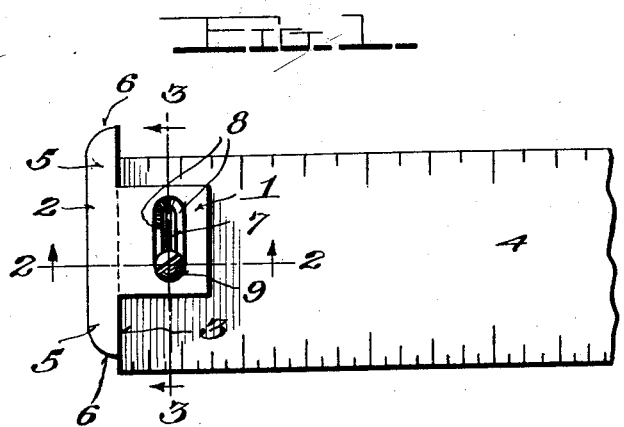
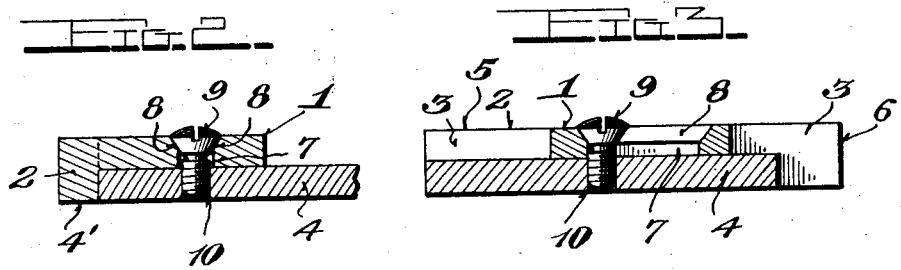

Patented Dec. 10, 1929

1,739,485

UNITED STATES PATENT OFFICE

ARNOLD W. MEYER, OF PROVIDENCE, RHODE ISLAND, ASSIGNOR TO BROWN & SHARPE MFG. CO., OF PROVIDENCE, RHODE ISLAND

HOOK RULE

Application filed November 5, 1926. Serial No. 146,396.

This invention relates to certain new and useful improvements in hook rules and the primary object of the invention is to provide a device of this character wherein the hook may be shifted from one side of the rule to the other and wherein in each position the scale of the rule can be completely and freely read.

A further object of the invention is to provide a hook attachment for rules which permits the rule to lie flat upon the work.

The invention still further aims to provide an attachment of the type set forth which is of simple and economical construction and one which can be easily and quickly manipulated.

In the drawings:—

Fig. 1 is a top plan view of the invention applied to an end of a rule;

Fig. 2 is a section on line 2—2 of Fig. 1, and

Fig. 3 is a section on line 3—3 of Fig. 1.

In proceeding in accordance with the present invention, a preferably metal body is employed which has an offset shank 1 and a head 2, the two conjointly defining a T-shape configuration. The head 2 has its inner side face formed to lie in flat engagement with the end 3 of the rule 4 and to have its bottom face 4 lie flush with the bottom face of the rule 4. The ends 5 of the head are free and have rounded outer sides that are adapted to project outwardly beyond the shank 1 and beyond the side edges of the rule 4 to thereby form hook 6. The shank 1 is of such width as to expose the graduations on the member 4 to the end thereof and is disposed on the upper face of the rule, the shank 1 is also formed with a transverse slot 7 that has beveled side walls 8. A screw 9 extends through the slot 7 and into a threaded aperture 10 provided therefor in the rule 4. Preferably the bottom of the slot 7 is of a width in excess of that of the diameter of the threaded part of the screw, so that upon loosening of the screw, the attachment will be free of engagement with the end of the rule, and upon tightening of the screw the attachment will be drawn into close engagement with the rule end and locked thereto.

From the foregoing it will be seen that by manipulation of the screw, the attachment may be easily and quickly moved to project either of its ends or hooks 6 outwardly from either the top or bottom side of the rule and in such movement no wear occurs against the rule end, due to the loosening of the screw freeing the attachment of engagement with the rule end.

The head of the attachment also lies flush with the rule bottom due to the offsetting of the shank 1, so that the former does not interfere with the rule lying flat upon the work.

Obviously, either end 5 may be omitted, if desired, to form an L-shaped instead of the T-shaped structure shown.

Having thus described my invention what I claim as new and desire to secure by Letters Patent is:—

1. In a hook rule in combination with a rule having a threaded aperture, a substantially T-shaped attachment having its head engaged with an end of the rule and disposed flush with the rule bottom and having its shank offset and engaged with the upper face of the rule, said shank having a transverse slot formed with tapered side walls, and a screw in the slot threaded into the rule aperture and having a conical head engageable with the tapered slot walls, the bottom of the slot being of greater width than the diameter of the threaded part of the screw to allow the head to move free of engagement with the rule end upon loosening of the screw.

2. In a hook rule, in combination with a rule having a threaded aperture, a substantially T-shaped attachment having its head engaged with an end of the rule and disposed flush with the rule bottom and having its shank offset and engaged with the upper face of the rule, said shank having a transverse slot and a screw extending through the slot and into the threaded aperture of the rule.

3. In combination with a rule, a T-shaped attachment therefor, and means to secure the attachment to the rule, said attachment being formed to provide for selective projection of the ends of the head of the attachment beyond either side edge of the rule.

4. In combination with a rule, a member having an elongated head slidably engaged with an end of the rule and disposed flush with the bottom thereof and having free ends, attaching means carried by the member and engaged with the upper face of the rule and means to slidably secure the attaching means to the rule and to hold same in adjusted positions thereon whereby to provide for selective projection of either of the free ends of the member beyond the adjacent side edge of the rule.

5. In combination with a rule, an attachment embodying a member engaged with an end of the rule and disposed flush with the bottom thereof, and means disposed wholly above the bottom of the rule to secure the member to the rule so as to enable either end of the member to be projected beyond the adjacent side edge of the rule and to expose the graduations on the rule.

In testimony whereof I have signed my name to this specification.

ARNOLD W. MEYER.